L. J. CAMPBELL.
TRANSMISSION LOCK.
APPLICATION FILED AUG. 6, 1920.
1,365,657.
Patented Jan. 18, 1921.
2 SHEETS—SHEET 1.
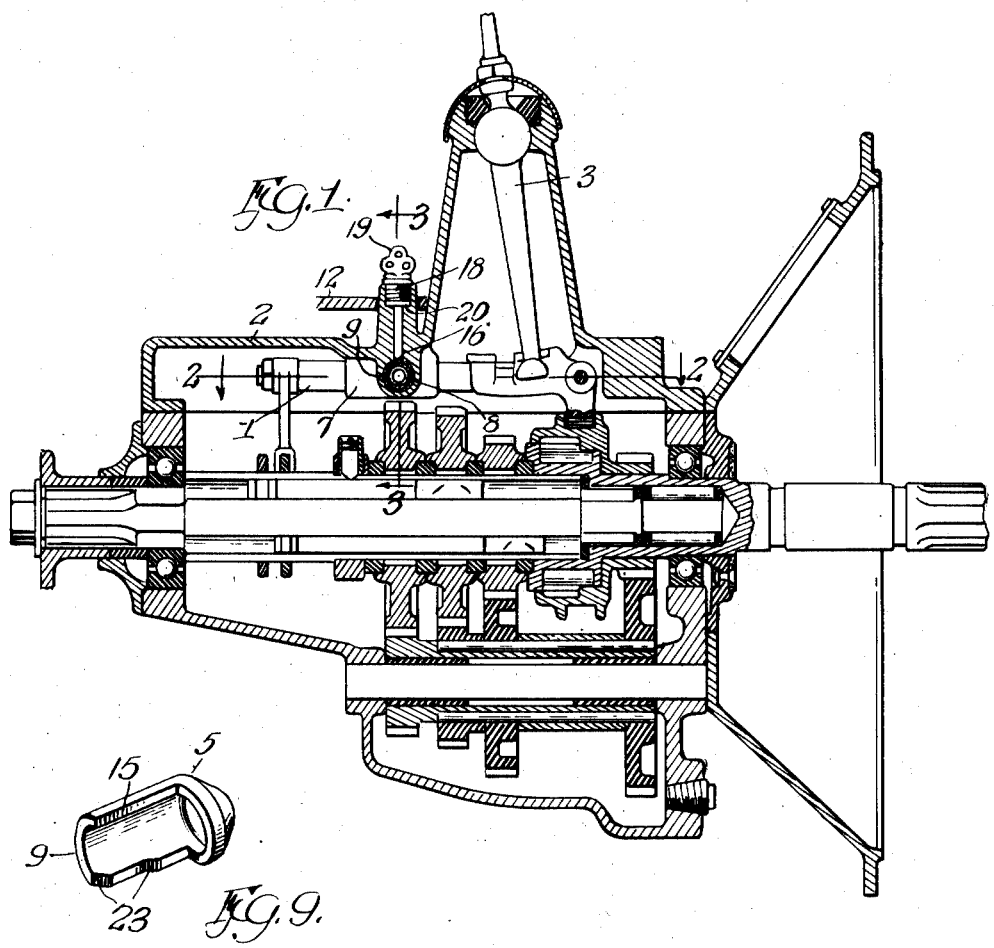
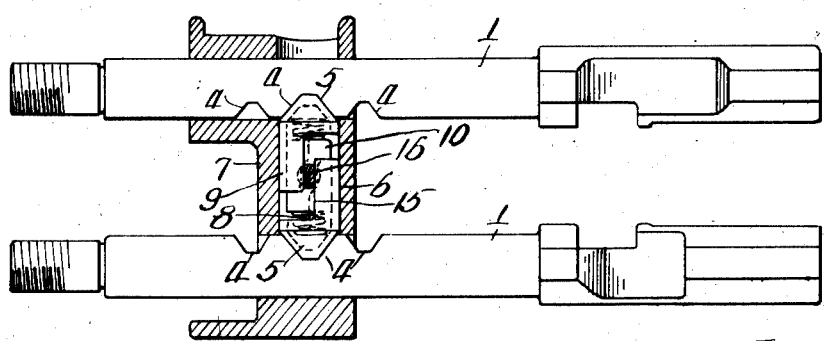
Inventor
Leon J. Campbell
by Eugene␣ ␣, Atty.

L. J. CAMPBELL.
TRANSMISSION LOCK.
APPLICATION FILED AUG. 6, 1920.
1,365,657.
Patented Jan. 18, 1921.
2 SHEETS—SHEET 2.
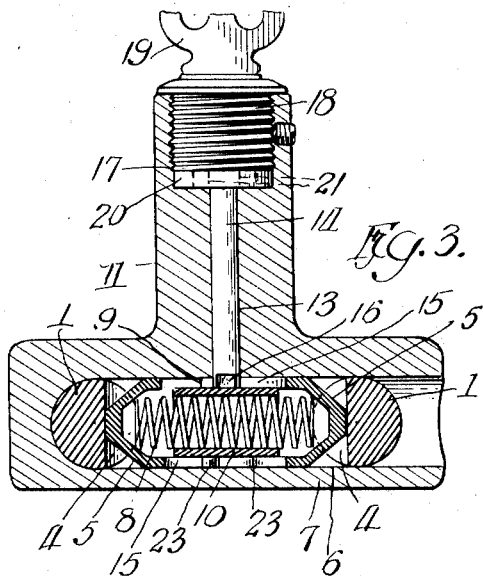
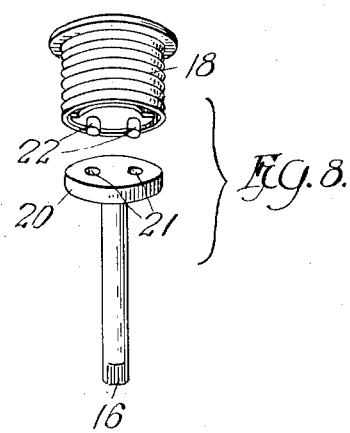
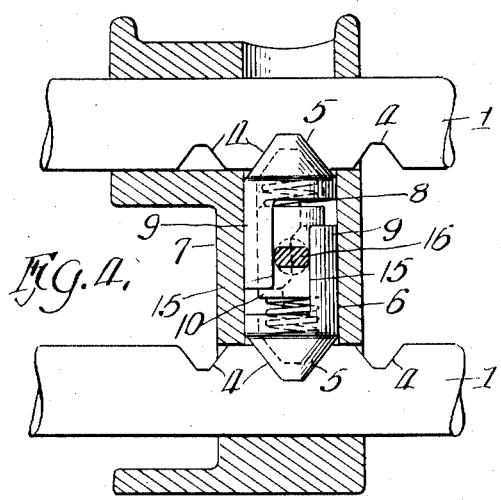
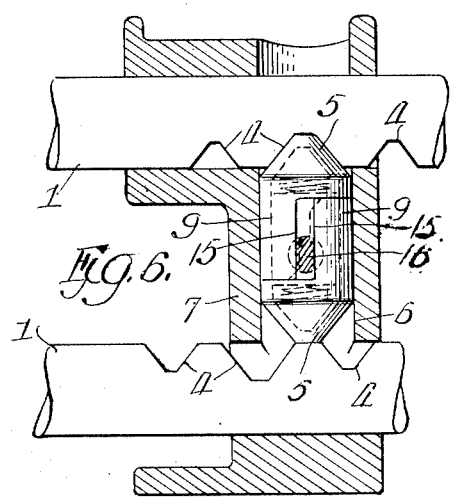
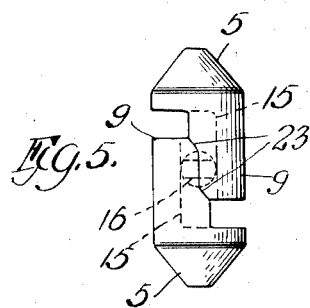
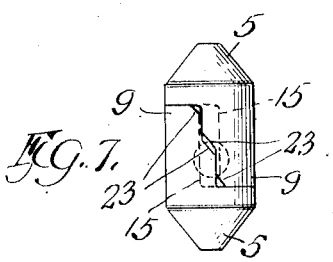
Inventor
Leon J. Campbell
by Eugene Ewan, Atty.

UNITED STATES PATENT OFFICE.

LEON J. CAMPBELL, OF BUCHANAN, MICHIGAN.

TRANSMISSION-LOCK.

1,365,657.   Specification of Letters Patent.   Patented Jan. 18, 1921.

Application filed August 6, 1920. Serial No. 401,628.

*To all whom it may concern:*

Be it known that I, LEON J. CAMPBELL, a citizen of the United States, residing at Buchanan, in the county of Berrien and State of Michigan, have invented new and useful Improvements in Transmission-Locks, of which the following is a specification.

This invention relates to transmission locks for motor vehicles and consists in the matters hereinafter described and more particularly pointed out in the appended claims.

In the accompanying drawings—

Figure 1 is a longitudinal vertical sectional view taken through a transmission mechanism of a motor vehicle and showing incorporated therein a transmission locking device of my invention;

Figs. 2 and 3 are enlarged horizontal and vertical sectional views taken on lines 2—2 and 3—3, respectively, of Fig. 1;

Fig. 4 is a horizontal sectional view, with parts in elevation, showing the checks held in position locking both shift rods against movement in all directions;

Fig. 5 is a bottom plan view of the checks when positioned as shown in Fig. 4;

Fig. 6 is a view similar to Fig. 4 and showing the checks in positions to be hereinafter described;

Fig. 7 is a bottom plan view of the checks when positioned as shown in Fig. 6;

Fig. 8 is a perspective view of the key barrel and stem; and

Fig. 9 is a perspective view of one of the checks.

In the drawings, I have shown a locking device of my invention applied to that type of automobile transmission mechanism which includes two substantially parallel shift rods 1, 1, slidably mounted in a casing 2 housing the transmission mechanism. The rods are shifted endwise, one at a time, by being engaged by a shift or control lever 3 to effect a change of speed and to place the gears of the transmission in neutral when desired.

Each rod 1 is provided with a plurality of notches 4, 4 to receive the conical ends of checks 5, 5, located between the rods. These checks are slidably and rockably mounted in a bore 6 in that portion 7 of the casing between the rods, as shown in the drawings. This bore opens at its ends into the holes formed in that part of the casing in which the rods slide, so that the conical ends of the checks may readily engage in notches in the rods and hold them, when the checks are unlocked, against accidental shifting movement. Between the checks is a coiled spring 8 acting normally to urge the checks apart and against the rods.

Each check 5 has an inwardly extending skirt or portion 9, forming part of a cylinder and being slightly less than half the circumference of the check. The skirts 9, 9 extend inwardly and overlap each other and bear against the wall of the bore 6, thus forming a bearing and guide for the checks. As one half of each check is, in effect, thus cut away, I insert between the checks a metal bushing 10, which is surrounded by the skirts 9, 9. This bushing has a diameter sufficient to maintain the skirts 9, 9 bearing properly at all times against the wall of the bore 6. The bushing 10 also completes the remaining side of the check and prevents it from tilting and binding in the bore 6 when the checks move endwise relatively to each other. The spring 8 extends through the bushing 10.

Extending upward from the casing portion 7 between the shift rods 1, 1, is a locking casing 11 of such length to extend above or be substantially flush with the floor 12 of the car, as shown in Fig. 1. The lock casing 11 has a vertical bore 13 opening at its lower end into the bore 6 between the checks, and rotatably mounted in said bore 13 is a key operated stem or member 14. Said member 14 has its lower end extending into the space between the adjacent straight side edges 15, 15 of the skirts 9 on the checks and there has an elongated portion 16, as shown. The upper end of the bore 13 opens into an enlarged cylindric chamber 17, in which is secured the barrel 18 of a lock having a rotatable cylinder operated by a key 19 in a manner well known with locks of this general type. The upper end of the stem 14 has a head 20 provided with holes or sockets 21 to receive pins 22 on the bottom of the lock cylinder. The opposite adjacent side edges of the skirts 9, 9 are provided with coöperating cam surfaces 23, 23, facing each other and arranged, in the example shown, substantially at a 45° angle to the length of the skirts.

When the elongated end 16 of the member 14 is in a position parallel with the straight side edges 15, 15 of the skirts 9, the latter, having the circumferential dimension referred to, permit the checks to rock with respect to each other far enough to allow the cam surfaces to pass each other upon moving the checks endwise relative to each other by either shift rod, the checks being rocked by the cam surfaces riding over each other. Thus the checks are free to move endwise out of the notches 4 and release the rods when the latter are shifted to register a speed or place the car in neutral.

To lock the shift rods 1, 1 when in neutral against movement in all directions, and thus lock the transmission so that the car cannot be stolen, the key 19 is engaged with the cylinder of the lock and turned in a direction to cause the elongated end portion 16 of the member 14 to extend transversely across the space between the straight side edges 15, 15 of the checks. This causes the end portion 16 to operate against the side edges of the checks and rock or spread them apart in a direction to bring the cam surfaces 23 in contact, as shown in Figs. 4 and 5. When the parts are in such positions, the elongated end portion 16 holds the checks against a return rocking movement and thus maintains the shift rods locked, as the checks are at that time engaged with notches in the rods, that is, there is a check in a notch in each rod, as is the case when the transmission is in neutral. The checks cannot move out of the notches as the engaged cam faces prevent that. To unlock the lock, the key is used to turn the member 14 in the opposite direction to bring the elongated end 16 in a position parallel with the straight side edges 15 of the checks and out of endwise contact therewith. At this time no movement is imparted to the checks by the key, as all that the key is required to do in unlocking the lock is merely to turn the elongated portion 16 into the position mentioned and shown in Figs. 2 and 6. The checks are thus free to be rocked by the cam surfaces upon the movement of the checks toward each other when either shift rod is moved to register a speed. Consequently, should the oil about the shift rods and the checks become congealed or frozen up, as it often does in cold weather, the operator is not called upon by means of the small key 19 to move any of the parts against this resistance, which could not be done with such small leverage as furnished by the key. By merely requiring the key to move the elongated end 16 into unlocked position and thus permit the cam surfaces to effect the rocking of the checks, the checks are rocked and moved endwise with respect to each other to release the shift rods upon the operation thereof by the control or shift lever 3. Thus considerable leverage is at hand to effect the movement of the checks after the lock has been unlocked and that leverage is sufficient to overcome any resistance that might be presented should the parts be frozen up. When locking the lock, the key is only required to move the checks apart a slight distance, and sufficient leverage is presented by the key for that purpose. But, in most cases, the lock is locked immediately after the car has stopped and the oil about the parts is in a lubricating state as the parts are warm. It is at the time of unlocking the lock that the resistance is felt, because the car has usually stood idle for some time and in cold weather freezing of the oil is a common occurrence.

The member 14 extending between the side edges 15 of the skirts 9, rather than between the end edges, enables the skirts to be made sufficiently long to perform two functions; first, the bearing surface for the checks may be long enough to prevent the checks tilting and binding in the bore 6 at any time when moved by the shift rods; second, when one check is engaged in one notch in one shift rod and the other check is out of a notch in the other shift rod, as happens when moving to a speed, the skirts 9, 9 may be made long enough to abut endwise against the heads of the checks, as shown in Figs. 6 and 7. As one check is held from endwise movement by being against the portion of the rod between notches, the skirt of that check abuts against the head of the other check and prevents the latter from movement out of the notch in the rod which it engages. Thus the rod not engaged by the control lever 3 is held from shifting in either direction, accidentally or otherwise, with the result that two speeds cannot be registered at the same time. The sleeve 10 is no longer than the distance between the heads of the checks when in this position. This prevents the sleeve hindering any movement of the checks toward each other. The end 16 when turned to extend across the space between the skirts 9 acts during the turning movement to spread the checks apart and force them tightly against the wall of the bore 6, thus additionally giving effective locking action to the parts.

The locking device described and shown provides an efficient and effective lock for a transmission and when locked cannot be unlocked by one not having the right key. This prevents the car from being stolen and reduces the insurance rates on cars so equipped. Moreover, the lock is simple in its construction and operation and, being devoid of complex parts, is easy to manufacture and at a relatively small cost. The construction is such that the leverage of the control lever is used to move the checks after the lock is unlocked, thus throwing no burden on the owner or driver of the car in unlocking the lock.

While I have shown and described herein in detail a transmission lock embodying the features of my invention, it is of course to be understood that the details of construction and arrangement of parts shown may be variously changed and modified without departing from the spirit and scope of my invention.

I claim as my invention:

1. The combination with a transmission mechanism having two parallel shift rods with notches, of a locking device, comprising two spring pressed checks adapted to releasably engage the notches in said rods and rockably mounted between the same, said checks having coöperating cam surfaces acting upon the endwise movement of the checks relatively to each other by either of said shift rods to rock the checks in a direction permitting the cam surfaces to pass each other, and a key operated means adapted when moved in one direction to rock said checks in a direction to bring said cam surfaces in contact and hold the checks against a return rocking movement so that the engaged cam surfaces will prevent the checks from movement out of the notches in the rods, the checks being permitted to release the rods when the key operated means is moved in the opposite direction.

2. The combination with a transmission mechanism having two parallel shift rods with notches, of a locking device, comprising two spring pressed checks adapted to releasably engage the notches in the rods and rockably mounted between the same, bearing parts on said checks extending inwardly and overlapping each other and having coöperating cam surfaces acting upon the endwise movement of the checks relatively to each other by either of said shift rods to rock the checks in a direction to permit the cam surfaces to pass each other, and a key operated member adapted when moved in one direction to operate on said bearing parts to rock the checks in a direction to bring the cam surfaces in contact and hold the checks against a return rocking movement so that the engaged cam surfaces will prevent the checks from movement out of the notches in the rods, the checks being permitted to release the rods when said member is moved in the opposite direction.

3. The combination with a transmission mechanism having two parallel shift rods with notches, of a locking device, comprising two spring pressed checks adapted to releasably engage the notches in said rods and rockably mounted between the same, skirts on said checks and extending inwardly and overlapping each other and having on two of their adjacent side edges coöperating cam surfaces acting upon the endwise movement of the checks relatively to each other by either of said shift rods to rock the checks in a direction permitting the cam surfaces to pass each other, and a rockably mounted key operated member having an elongated portion in the space between the other side edges of said skirts and adapted upon the rotation of said member in one direction to be extended across said space and operate on said side edges to rock the checks in a direction to bring the cam surfaces in contact and hold the checks against a return rocking movement so that the cam surfaces will prevent the checks from movement out of the notches in the rods, the checks being permitted to release the rods when said member is turned in the opposite direction to bring its elongated portion parallel with said side edges.

4. The combination with a transmission mechanism having a casing and two parallel shift rods with notches slidably mounted therein, of a locking device, comprising two spring pressed checks adapted to releasably engage the notches in said rods and rotatably mounted in the casing between the same, skirts on said checks and extending inwardly and overlapping each other and provided on two of their adjacent side edges with coöperating cam surfaces acting upon the endwise movement of the checks relatively to each other by either shift rod to rock the checks in a direction permitting the cam surfaces to pass each other, and a key operated member having an elongated portion in the space between the other side edges of said skirts and adapted when rotated in one direction to operate on said side edges to rock the checks in a direction to bring the cam surfaces in contact and hold the checks against their return rocking movement and to force the checks tightly against the walls of the chamber in which the checks are located, the checks being permitted to move endwise relative to each other when said member is turned in the opposite direction.

5. The combination with a transmission mechanism having two parallel shift rods with notches, of a locking device, comprising two spring pressed checks with heads adapted to releasably engage the notches of said rods and rockably mounted between the same, skirts on said checks and overlapping each other and having a length sufficient to cause the skirt on one check to abut endwise against the head on the other check when one check is in a notch in one rod and the other check engages the other rod out of a notch, said skirts having coöperating cam surfaces acting upon the endwise movement of the checks relatively to each other by either rod to permit the cam surfaces to pass each other, and a key operated means adapted when moved in one direction to rock the checks in a direction to bring said cam surfaces in contact and hold the checks against a return rocking movement when both checks engage notches in the rods, the checks being permitted to move out of the notches in the rods when said member is moved in the opposite direction.

6. The combination with a transmission mechanism having two parallel rods with notches, of a locking device, comprising two checks slidably and rockably mounted between the rods and adapted to releasably engage in the notches thereof, a skirt on each check, each skirt being slightly less than half the circumference of the check, said skirts being provided on two of their adjacent side edges with coöperating cam surfaces acting upon the movement of the checks endwise relatively to each other by either shift rod to rock the checks and permit the cam surfaces to pass each other, a bushing surrounded by said skirts and forming a bearing therefor, a spring in said bushing and acting against said checks to urge them toward the rods, and a rotatably mounted key operated member having an elongated portion in the space between the other side edges of said skirts and adapted upon the rotation of said member in one direction to rock the checks in a direction to bring the cam surfaces in contact and hold the checks against a return rocking movement, the checks being permitted to be moved endwise relatively to each other upon the turning of said member in the opposite direction to bring its elongated portion in line with said side edges.

In testimony that I claim the foregoing as my invention, I affix my signature this 3 day of August, A. D. 1920.

LEON J. CAMPBELL.